May 9, 1944.　　　　J. A. ANTONELLI　　　　2,348,586
OIL SEAL
Filed Oct. 10, 1942

Witness:
Chas. R. Koursh

INVENTOR.
BY Joseph A. Antonelli,
Parkinson & Lane
Attys.

Patented May 9, 1944

2,348,586

UNITED STATES PATENT OFFICE 2,348,586

OIL SEAL

Joseph A. Antonelli, Elgin, Ill., assignor to Victor Manufacturing & Gasket Company, Chicago, Ill., a corporation of Illinois Application October 10, 1942, Serial No. 461,575

3 Claims. (Cl. 286—5)

The present invention relates to an oil seal and especially to a seal primarily designed for use in connection with a distributor for an aviation engine wherein the distributor is driven from the engine. In this type of assembly, one side of the seal faces toward the crank case and retains the lubricant, and the opposite side of the seal faces toward the distributor mechanism and excludes lubricant and any foreign matter from entering the distributor mechanism.

The novel oil seal is provided with opposed sealing members so constructed and arranged that their contiguous or adjacent contacting faces provide a series of spaced, substantially radially extending grooves or labyrinths affording drainage of any lubricant that may seep or leak by the sealing lip on the crank case side of the oil seal and thereby assure against any lubricant entering the electrical mechanism of the distributor.

The novel invention comprehends providing or forming lands or raised surfaces on the sealing members to afford adequate drainage therebetween. These lands, embossments or raised surfaces are so disposed that the grooves or labyrinths between the lands or embossments of the sealing members need not be aligned when placed in the retaining shell, but may be staggered or assume any position relative to each other and still properly function to drain away any lubricant that may seep or leak past the sealing lip from the crank case.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

Figure 1:
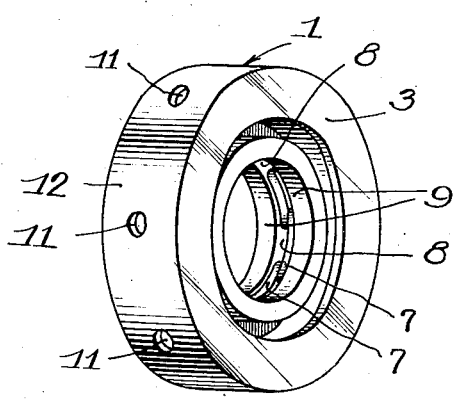
Figure 1 is a perspective view of the novel oil seal.

Referring more particularly to the drawing and the embodiment therein selected to illustrate the novel invention, the oil seal shown in Figures 1 to 5, inclusive, comprises a retaining shell or channel 1 having its opposite edges 2 and 3 turned inwardly to mount and clamp therebetween a pair of sealing members 4, 4. These sealing members are similar in construction and each comprises a sealing element 5 preferably formed of an oil resistant compounded synthetic rubber molded or bonded to a metal washer or ring 6. By bonding the sealing elements to the metal washers, when the outer channel or shell is closed onto the sealing members 4, it closes against the metal washers and maintains a rigid assembly to thereby assure a proper press-fit in a given housing in which the seal is mounted.

Each sealing element is formed or molded with a series of lands or embossments 7 suitably spaced apart to provide a plurality of substantially radially extending grooves or labyrinths 8 for the drainage of any lubricant, etc., which may by-pass the sealing lip 9. This sealing lip is preferably formed integral with the body of the sealing element but so disposed as to have a continuous wiping and sealing contact with a shaft or other part which it encompasses.

Figure 2:
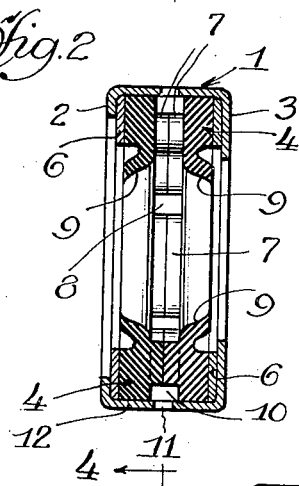
Figure 2 is a view in vertical cross section through the seal to show more clearly the construction and relation of the sealing members.
Figure 4:
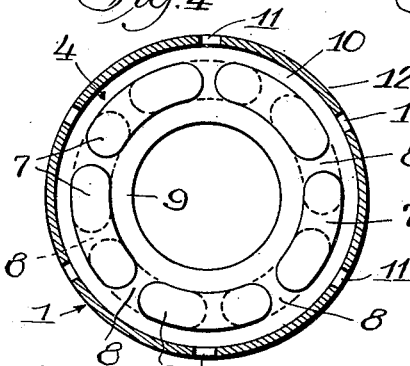
Figure 4 is a vertical cross section taken on the line 4—4 of Figure 3 and showing in dotted outline the staggered relation of the lands or embossments on the opposed sealing members.
Figure 5:
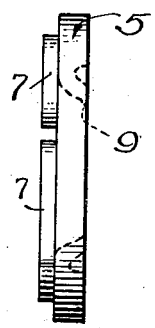
Figure 5 is a view in end elevation of one of the sealing elements, but omitting its metal washer or ring to which it is bonded.
Figure 3:
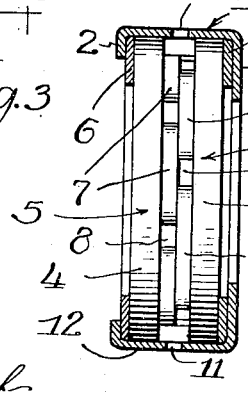
Figure 3 is a view similar to Figure 2 but showing the sealing elements in side elevation and the lands or embossments of the opposite sealing members and the grooves provided thereby in staggered relation.

As clearly shown in Figures 2 and 3, the lands or embossments 7 project inwardly and are maintained in abutting relationship. These may be placed in alignment or made to coincide with the resulting alignment of the grooves or labyrinths 8, or these lands may be staggered with consequent staggering of the grooves. In either event, were lubricant, etc., to leak or seep by the sealing lip 9, it would drain outwardly through the grooves 8 to the annular recess 10, and be discharged through one or more openings 11 spaced about the cylindrical wall 12 of the channel member or retaining shell 1. At least one of these openings 11 will always be in alignment with drain grooves provided at the bottom of the surrounding housing in which the seal is mounted.

Figures 6, 7:
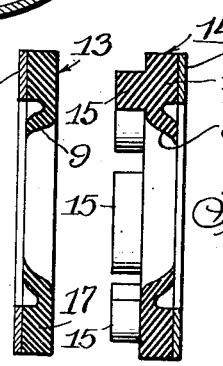
Figures 6 and 7 are views of an alternate form of sealing members in which the lands are provided on but one of these members.

Figures 6 and 7 disclose an alternate construction of sealing members 13 and 14 in which the lands or embossments 15 are provided only on the sealing element 16 of the member 14. The inner face of the sealing element 17 of the member 13 is made plain and the lands 15 of the member 14 abut thereagainst. In other respects this construction is similar to that shown in the other views.

Although I have explained that the present seal is primarily adapted for use in connection with the distributor of an aviation engine, the seal is likewise adapted for numerous other applications including use in connection with a centrifugal pump to seal fluid on one side thereof and prevent intake of air at the opposite side.

The sealing elements may be constructed of any resilient material suitable for the purpose. Excellent results have been had by the use of any one of the oil resistant, compounded synthetic rubbers.

Having thus disclosed my invention, I claim:

1. A unitary seal for sealing a pair of members such as a rotatable shaft and its surrounding housing against the escape or passage of lubricant or other fluids, comprising an annular retaining shell, a pair of sealing elements mounted within the shell in abutting relation and each provided with a sealing lip in spaced and opposed wiping contact with one of the members, and passages provided in the abutting surfaces of the elements and shell for draining away from the elements any lubricant leaking or seeping past a sealing lip.

2. A seal for sealing a pair of members such as a rotatable shaft and its surrounding housing against the escape or passage of lubricant or other fluids, comprising a channel-shaped retaining shell, a pair of opposed sealing elements mounted between the opposite side walls of the retaining shell, the abutting faces of the sealing elements being provided with spaced lands forming grooves therebetween for the passage of any lubricant collecting between the sealing elements, and openings provided in the retaining shell and communicating with the grooves for discharging any lubricant from the grooves.

3. A seal for sealing a pair of members such as a rotatable shaft and its surrounding housing against the escape or passage of lubricant or other fluids, comprising a channel-shaped retaining shell, a pair of sealing members mounted between the opposite side walls of the retaining shell and each provided with a sealing lip in spaced wiping contact with the shaft, lands projecting from an inner adjacent face of at least one of the sealing members, passages provided between the lands for draining away any lubricant or other fluid which may leak or seep past either of said lips to the interior of the seal, and openings provided in the retaining shell for the passage of lubricant collected in the passages.

JOSEPH A. ANTONELLI.